United States Patent [19]
Tajima

[11] 4,439,530
[45] Mar. 27, 1984

[54] OPTICAL GLASS

[75] Inventor: Hidemi Tajima, Tokyo, Japan

[73] Assignee: Hoya Corporation, Tokyo, Japan

[21] Appl. No.: 459,552

[22] Filed: Jan. 20, 1983

[30] Foreign Application Priority Data

Jan. 25, 1982 [JP] Japan .................................. 57-8991

[51] Int. Cl.³ .............................................. C03C 3/16
[52] U.S. Cl. ...................................... 501/45; 501/46; 501/47; 501/48; 501/901; 501/903
[58] Field of Search ........................ 501/45, 46, 47, 48, 501/901, 903

[56] References Cited
U.S. PATENT DOCUMENTS 4,108,673 8/1978 Toratani et al. ........................ 501/46
4,193,807 3/1980 Ishibashi et al. ........................ 501/46

Primary Examiner—Mark Bell
Attorney, Agent, or Firm—Sughrue, Mion, Zinn, Macpeak and Seas

[57] ABSTRACT

An optical glass comprising, in % by weight,
18 to 38% $P_2O_5$;
3 to 30% $Na_2O + K_2O$,
  with the proviso of
    0 to 30% $Na_2O$ and
    0 to 30% $K_2O$;
8 to 65% PbO;
1 to 45% $Ta_2O_5$;
0 to 20% $Nb_2O_5$;
0 to 15% $TiO_2 + WO_3$;
0 to 25% $BaO + CaO + ZnO + SrO + MgO$,
  with the proviso of
    0 to 25% BaO,
    0 to 5% CaO,
    0 to 25% ZnO,
    0 to 20% SrO, and
    0 to 10% MgO;
0 to 15% $B_2O_3$;
0 to 3% $Li_2O$;
0 to 3% $Al_2O_3$;
0 to 3% $ZrO_2$;
0 to 3% $Y_2O_3$;
0 to 3% $Gd_2O_3$; and
0 to 3% $La_2O_3$.

1 Claim, 1 Drawing Figure

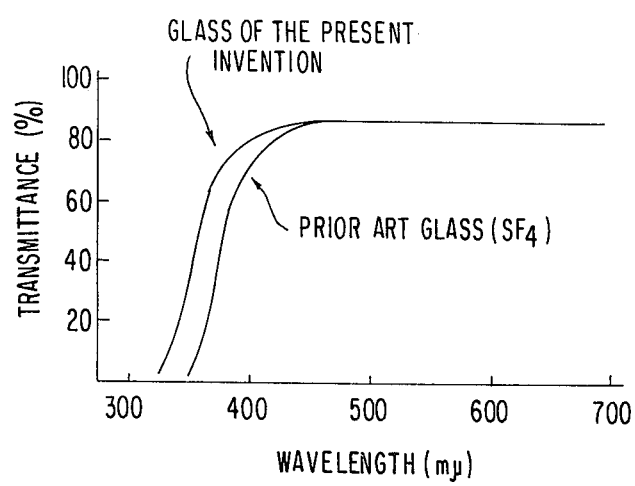

OPTICAL GLASS

FIELD OF THE INVENTION

The present invention relates to an optical glass having specific optical constants expressed by a refractive index (nd) of 1.58 to 1.91 and an Abbe number ($\nu d$) of 20 to 45 and also having an excellent transmittance.

BACKGROUND OF THE INVENTION

An $SiO_2$-$R_2O$-$PbO$ system or $SiO_2$-$R_2O$-$TiO$ system silicate glass has heretofore been known as a high refractive index and high optical scattering glass having the optical constants within the above-described ranges as described in, for example, Japanese Patent Publication No. 8394/1967. However, these glasses tend to color and have poor transmission characteristics in the region of from an ultraviolet region to a visible light region, causing disadvantages on the preparation of lenses.

Regarding glass forming materials, to obtain a glass having a high transmittance in the ultraviolet region a phosphate glass is advantageous as compared with a silicate glass or a borate glass for the reasons described below. The phosphate glass has an excellent transmission characteristic in the regions of from an ultraviolet region to a visible light region as compared with that of the silicate glass or borate glass. In addition, the phosphate glass can be glassified by melting at a low temperature, resulting in preventing contamination of impurities from a crucible.

On the other hand, phosphoric acid has a stronger reducing property than other glass forming materials and, as a result, a glass colors depending on the conditions such as components, glass composition, atmosphere, etc. For example, $TiO_2$, $WO_3$ and $Nb_2O_5$ are conventionally used as the components which give a high refractive index to the glass and improve a chemical durability of the glass and these components cause the source of glass coloration when such are reduced. On the contrary to this, $Ta_2O_5$ is not reduced and has less absorption in the regions of from an ultraviolet region to a visible light region. Therefore, $Ta_2O_5$ is preferred as a component which gives a high refractive index to a glass and improves the chemical durability of the glass.

SUMMARY OF THE INVENTION

As a result of various and extensive investigations on the glassification range which can exhibit the above-described excellent characteristics of the phosphate glass and $Ta_2O_5$, it has been found that in the three component systems of $P_2O_5$-$R_2O$-$Ta_2O_5$ and $P_2O_5$-$PbO$-$Ta_2O_5$, glassification does not occur where the amount of $P_2O_5$ is 38 wt% or less, but by making the four component system of $P_2O_5$-$R_2O$-$PbO$-$Ta_2O_5$, a stable glass can be obtained even though the amount of $P_2O_5$ is 35 wt% or less.

Accordingly, one object of the present invention is to provide a $P_2O_5$-$R_2O$-$PbO$-$Ta_2O_3$ four component system glass.

Another object of the present invention is to provide an optical glass having specific optical constants and excellent transmission characteristics in the range of from the ultraviolet region to the visible light region.

Still another object of the present invention is to provide an optical glass comprising, in % by weight, 18 to 38% $P_2O_5$;
3 to 30% $Na_2O + K_2O$,
  with the proviso of
    0 to 30% $Na_2O$ and
    0 to 30% $K_2O$;
8 to 65% $PbO$;
1 to 45% $Ta_2O_5$;
0 to 20% $Nb_2O_5$;
0 to 15% $TiO_2 + WO_3$;
0 to 25% $BaO + CaO + ZnO + SrO + MgO$,
  with the proviso of
    0 to 25% $BaO$,
    0 to 5% $CaO$,
    0 to 25% $ZnO$,
    0 to 20% $SrO$ and
    0 to 10% $MgO$;
0 to 15% $B_2O_3$;
0 to 3% $Li_2O$;
0 to 3% $Al_2O_3$;
0 to 3% $ZrO_2$;
0 to 3% $Y_2O_3$;
0 to 3% $Gd_2O_3$; and
0 to 3% $La_2O_3$.

BRIEF DESCRIPTION OF THE DRAWING

FIGURE is a graph showing the transmittance curves of the optical glass according to the invention and the conventional $SF_4$ glass.

DETAILED DESCRIPTION OF THE INVENTION

The criticality of the specific amounts of the glass components set forth above is described below. All percents herein are by weight.

$P_2O_5$ is a glass forming material. If the amount of $P_2O_5$ is less than 18%, the tendency of the glass to devitrify increases. If the amount of $P_2O_5$ is larger than 38%, the desired glass having a high refractive index cannot be obtained.

$Na_2O$ and $K_2O$ must be present in a total amount of 3 to 30%. If the total amount is outside the range, the tendency of the glass to devitrify increases. However, $Na_2O$ and $K_2O$ are not necessarily required to be copresent.

$PbO$ must be present in an amount of 8% or more to obtain a high refractive index and render the glass stable. However, if the amount of $PbO$ exceeds 65%, the tendency of the glass to devitrify increases remarkably.

$Ta_2O_5$ has the characteristics described before. $Ta_2O_5$ must be present in an amount of 1% or more to exhibit such characteristics. However, if the amount of $Ta_2O_5$ exceeds 45%, the tendency of the glass to devitrify increases.

$Nb_2O_5$ can be added in an amount of up to 20% as a component to adjust the optical constants. If, however, the amount of $Nb_2O_5$ exceeds 20%, the transmission characteristic of the glass deteriorates.

$TiO_2$ and $WO_3$ can be added as the components to adjust the optical constants. If the total amount of $TiO_2$ and $WO_3$ exceeds 15%, the coloration of the glass occurs, resulting in deterioration of the transmission characteristic of the glass.

$BaO$, $ZnO$, $SrO$, $MgO$ and $CaO$ can be added as the divalent components for adjusting the optical constants of the glass. If the amounts of $BaO$, $ZnO$, $SrO$, $MgO$ and $CaO$ exceed 25%, 25%, 20%, 10% and 5%, respectively, or if the total amount of the divalent components exceeds 25%, the tendency of the glass to devitrify increases.

$B_2O_3$ can be added in an amount of up to 15% without deteriorating the stability of the glass.

Each of $Li_2O$, $Al_2O_3$, $ZrO_2$, $Y_2O_3$, $Gd_2O_3$ and $La_2O_3$ can be added in an amount of up to 3.0% as the component to adjust the optical constants of the glass.

Examples of the glass according to the present invention and their properties are shown in Tables 1 and 2 below. The composition of each glass is expressed in % by weight.

TABLE 1

| Component | Example No. | | | | | | | |
|---|---|---|---|---|---|---|---|---|
| | 1 | 2 | 3 | 4 | 5 | 6 | 7 | 8 |
| $P_2O_5$ | 20.0 | 25.0 | 22.0 | 37.0 | 30.0 | 20.0 | 20.0 | 35.0 |
| $Na_2O$ | — | — | — | — | 20.0 | — | — | — |
| $K_2O$ | 5.0 | 15.0 | 10.0 | 13.0 | — | 5.0 | 5.0 | 25.0 |
| PbO | 55.0 | 20.0 | 43.0 | 47.0 | 25.0 | 55.0 | 50.0 | 15.0 |
| $Ta_2O_5$ | 20.0 | 40.0 | 25.0 | 3.0 | 25.0 | 10.0 | 10.0 | 15.0 |
| $WO_3$ | — | — | — | — | — | 10.0 | — | — |
| $Nb_2O_5$ | — | — | — | — | — | — | 15.0 | — |
| $TiO_2$ | — | — | — | — | — | — | — | 10.0 |
| nd | 1.856 | 1.711 | 1.775 | 1.651 | 1.646 | 1.861 | 1.891 | 1.663 |
| νd | 26.6 | 31.7 | 28.8 | 37.8 | 35.9 | 25.7 | 24.1 | 28.6 |

TABLE 2

| Component | Example No. | | | | | |
|---|---|---|---|---|---|---|
| | 9 | 10 | 11 | 12 | 13 | 14 |
| $P_2O_5$ | 35.0 | 30.0 | 35.0 | 30.0 | 25.0 | 27.0 |
| $K_2O$ | 25.0 | 15.0 | 15.0 | 15.0 | 25.0 | 20.0 |
| PbO | 15.0 | 20.0 | 15.0 | 20.0 | 20.0 | 25.0 |
| $Ta_2O_5$ | 20.0 | 15.0 | 15.0 | 20.0 | 20.0 | 25.0 |
| BaO | — | 17.0 | — | — | — | — |
| CaO | — | 3.0 | — | — | — | — |
| ZnO | — | — | 20.0 | — | — | — |
| SrO | — | — | — | 15.0 | — | — |
| MgO | 5.0 | — | — | — | — | — |
| $B_2O_3$ | — | — | — | — | 10.0 | — |
| $Al_2O_3$ | — | — | — | — | — | 3.0 |
| nd | 1.589 | 1.633 | 1.628 | 1.647 | 1.650 | 1.640 |
| νd | 43.2 | 40.5 | 39.4 | 39.7 | 37.8 | 34.5 |

The optical glasses of the present invention including the glasses shown in the Examples can be obtained by uniformly kneading starting materials such as orthophosphoric acid, a phosphate compound, potassium carbonate, sodium carbonate, lead oxide, lead nitrate, tantalum oxide, etc., melting the mixture in a crucible at 1,000° to 1,200° C., stirring the mixture to homogenize it and remove bubbles, casting the molten mixture into a mold pre-heated at a suitable temperature, and annealing the product.

The accompanying drawing shows the transmittance curve of the glass of Example 3 according to the present invention and also the transmittance curve of the conventional $SiO_2$-PbO glass ("SF4", a product shown in FIG. 2 of Japanese Patent Publication No. 28448/1978) having the optical constants nearly identical to those of the Example 3 glass of the present invention.

It can be apparent from the drawing that the glass of the present invention shows an excellent transmittance in the range of from the ultraviolet region to the visible light region as compared with that of the prior art glass.

While the invention has been described in detail and with reference to specific embodiments thereof, it will be apparent to one skilled in the art that various changes and modifications can be made therein without departing from the spirit and scope thereof.

What is claimed is:

1. An optical glass consisting essentially of, in % by weight,
   18 to 38% $P_2O_5$;
   3 to 30% $Na_2O+K_2O$,
   with the proviso of
     0 to 30% $Na_2O$ and
     0 to 30% $K_2O$;
   15 to 65% PbO;
   1 to 45% $Ta_2O_5$;
   0 to 20% $Nb_2O_5$;
   0 to 15% $TiO_2+WO_3$;
   0 to 25% $BaO+CaO+ZnO+SrO+MgO$,
   with the proviso of
     0 to 25% BaO,
     0 to 5% CaO,
     0 to 25% ZnO,
     0 to 20% SrO,
     0 to 10% MgO, and
     0 to 32% $K_2O+BaO$;
   0 to 15% $B_2O_3$;
   0 to 3% $Li_2O$;
   0 to 3% $Al_2O_3$;
   0 to 3% $ZrO_2$;
   0 to 3% $Y_2O_3$;
   0 to 3% $Gd_2O_3$; and
   0 to 3% $La_2O_3$.

* * * * *